July 25, 1967  H. J. WATERMANN  3,332,302
HIGH SPEED DRIVE
Filed June 29, 1965
4 Sheets-Sheet 4

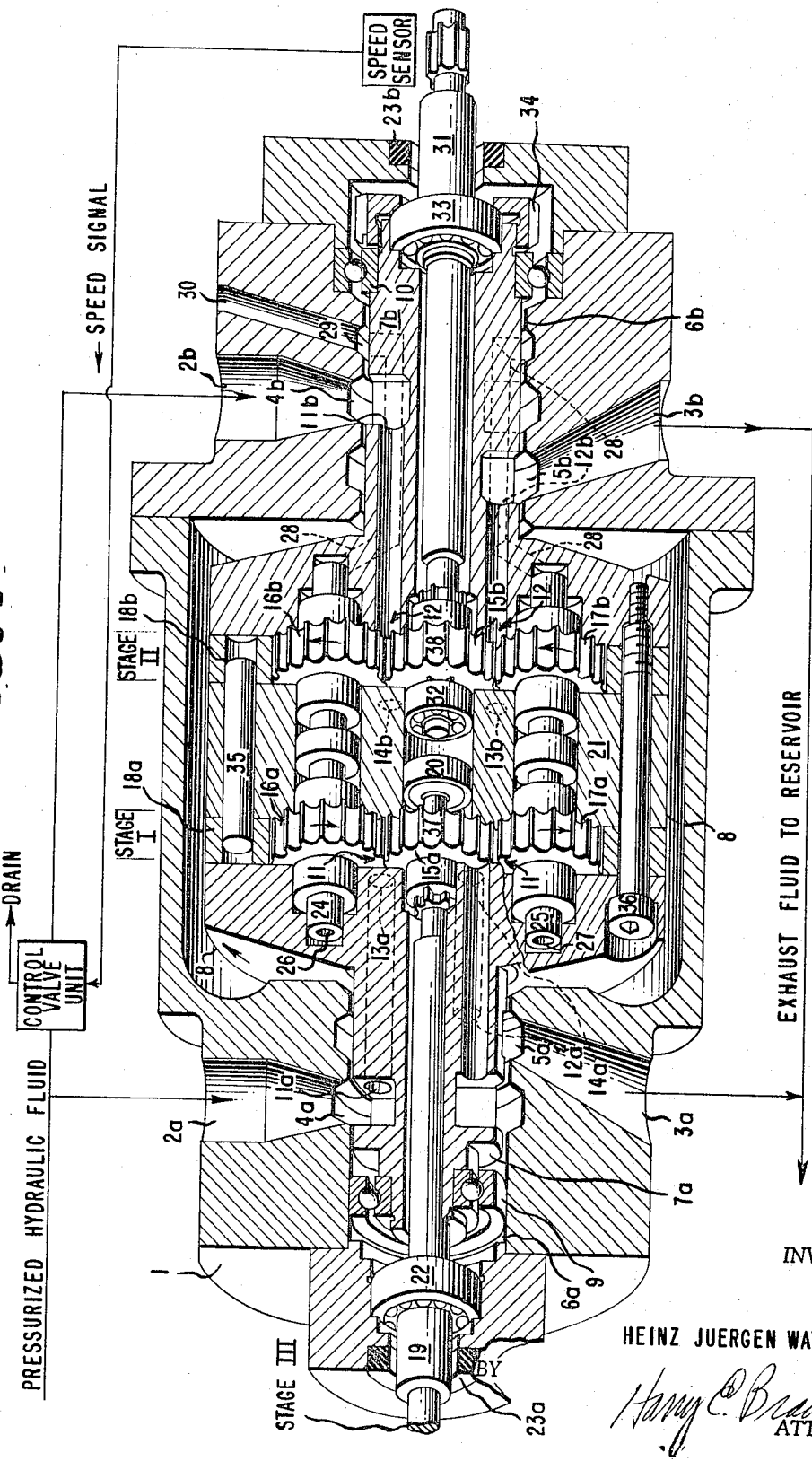

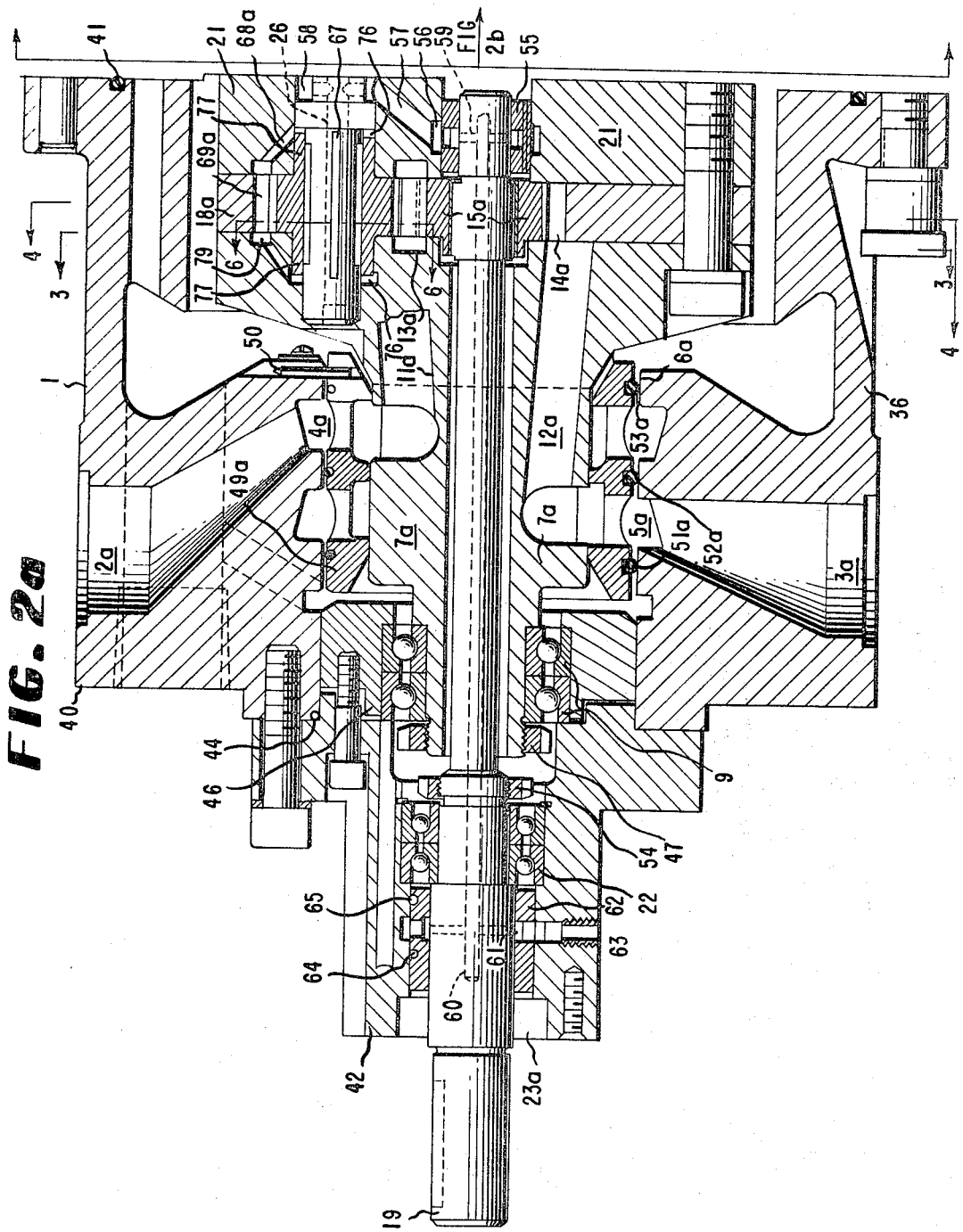

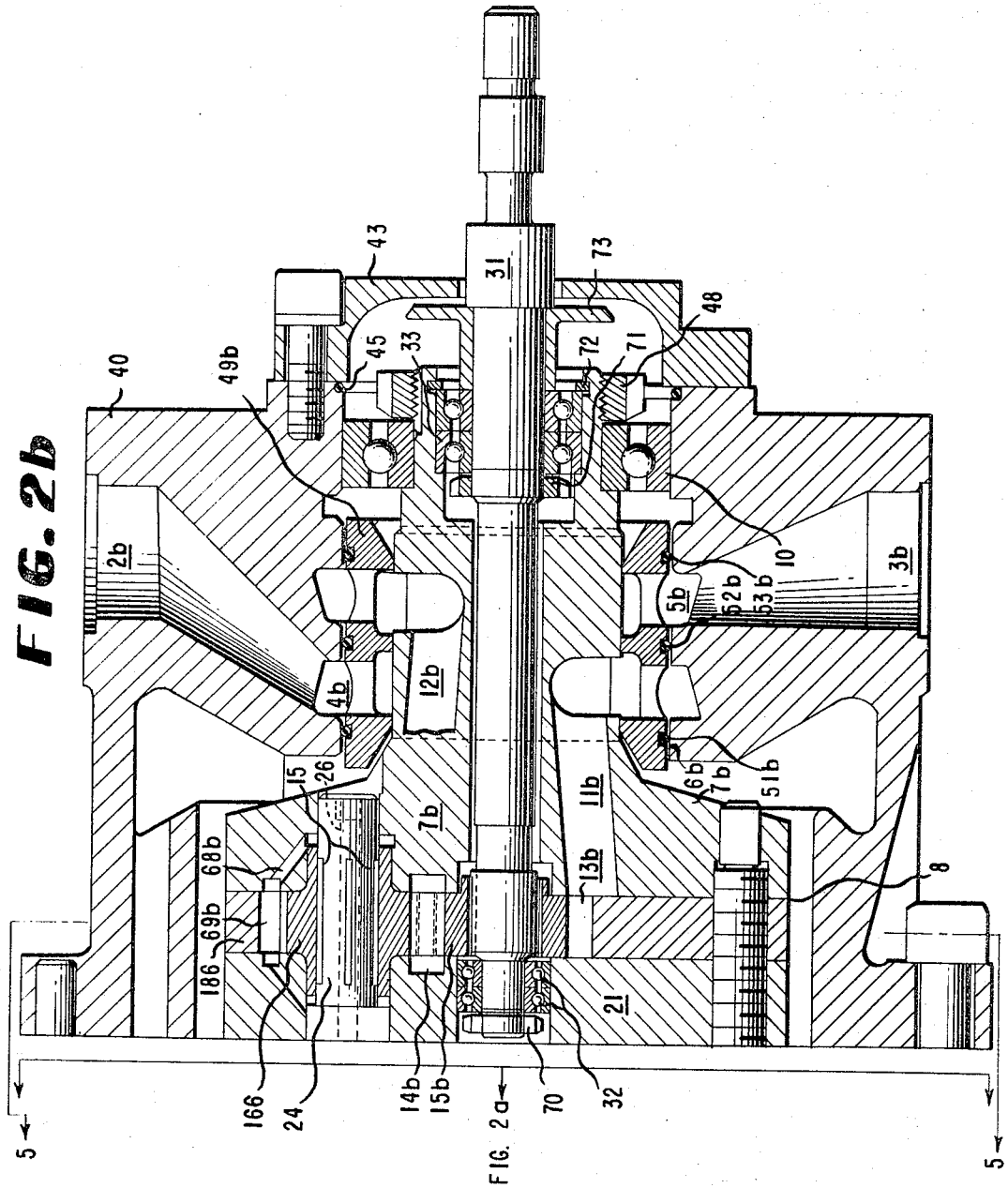

INVENTOR
HEINZ JUERGEN WATERMANN

BY *Harry E. Braddock*
ATTORNEY

United States Patent Office 3,332,302
Patented July 25, 1967

3,332,302
HIGH SPEED DRIVE
Heinz Juergen Watermann, Solingen-Ohligs, Germany, assignor to E. I. du Pont de Nemours and Company, Wilmington, Del., a corporation of Delaware
Filed June 29, 1965, Ser. No. 467,971
4 Claims. (Cl. 74—675)

This invention relates generally to improved high speed drives and, more particularly, to an improved hydraulic gear motor drive apparatus which is compact, simple, easily controllable, and capable of producing a wide variety output speeds in excess of 20,000 r.p.m.

Power transmission drives are increasingly being applied to higher speeds and higher horsepower end uses. In the design of high performance drives, there are numerous technical problems which resist solutions. For example, most prior art drives capable of speeds greater than 20,000 r.p.m. involve many stages which are inherently large and very costly. Moreover, speed variation or control of such drives is enormously complex and difficult.

It is recognized by the prior art that under certain circumstances high speeds may be achieved by means of specially designed turbines or electric motors coupled to gear transmissions. These devices are however best suited for constant speed applications for they possess considerable fly wheel effect which renders accurate, rapid response speed control extremely difficult. Moreover, the effective operating life of such apparatus is relatively short due to the high surface velocities generated in the bearing supports.

In still other situations due to the limited available space or economics, the use of electric motor drives is precluded. Likewise, in the case of turbines elaborate auxiliary equipment is required for supplying the power producing medium and the subsequent expelling of waste products; all of which must be located proximate to the prime mover.

A principal object of this invention is to provide a simple, compact, efficient high speed motor combination which is capable of producing an infinite variety of high speed outputs.

Another object of this invention is to provide an improved high speed motor combination having an arrangement of rotary components wherein contiguous components move at relatively low surface velocities.

Still another object of this invention is the provision of an improved high speed motor combination driven simultaneously from at least two independent power inputs thereby affording accurate, rapid speed control.

A further object of this invention is to provide a quiet, vibration free high torque producing improved speed increaser apparatus.

Additional objects and advantages will appear from a consideration of the following specification, the claims, and the accompanying drawings in which:

FIGURE 1 shows a partially schematic longitudinal cross sectional representation of a simple high speed motor combination embodying principles of this invention.

FIGURES 2a and 2b show a longitudinal cross section view of a preferred motor combination embodying principles of this invention.

Figure 3:
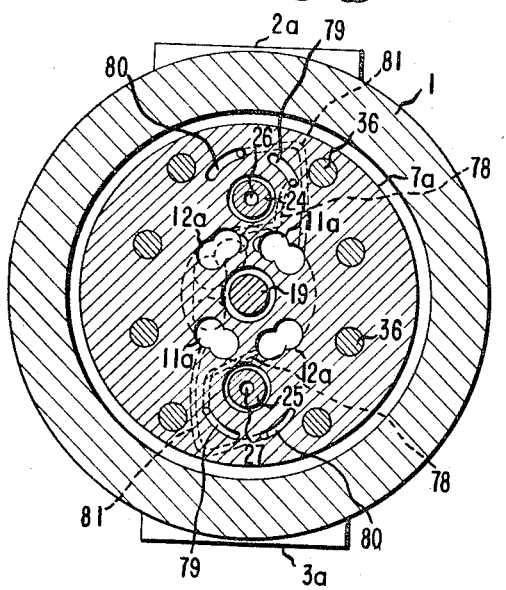
FIGURE 3 is a transverse cross sectional view of the first stage gear motor taken along line 3—3 of FIGURE 2a, showing the arrangement of the fluid conveying passages cooperating with the first stage gear motor.

The apparatus to be described utilizes three independent power stages to produce high output speeds. Each stage is operatively connected in sequence wherein one overdrives progressively the preceding stage such that the final output speed is the cumulative sum of the individual stages. The drive is composed essentially of two force-balanced hydrostatic gear motors arranged back-to-back within an intermediate rotary carrier member which is journaled in a stationary housing. Each gear motor is driven independently from a separate power source in opposite directions with respect to the carrier member on which they are mounted. Stage I gear motor is connected to a shaft hereinafter described as the driver shaft which when driven forms the stage III power source. Stage II gear motor is likewise connected to a second shaft (driven shaft) which serves as the high speed output shaft.

Referring now to FIGURE 1, a representation of the apparatus is shown in its simplest form. Power stage I is depicted by gear motor 37 and stage II by gear motor 38. Both motors are identical structurally and functionally, and comprise cooperating gear tooth structures on both the planetary gears and the engaged sun gears involved. As previously mentioned, the planetary gear elements of stage I and stage II are driven in opposite directions with each other and with respect to the carrier assembly in which they are mounted. To simplify the discussion, only stage I and its ancillary components will be described in detail; it being understood, of course, unless otherwise indicated, the discussion applies equally to stage II. Accordingly, similar reference numerals in the various figures identify similar parts. Reference numerals with letter suffix "a" designate stage I components and letter suffix "b" designate stage II counterparts.

The active components of the drive are enclosed in a generally cylindrical stationary housing 1 which is actually an assembly of four parts bolted together in the conventional manner, the main section which contains the power stages is made in two pieces to facilitate fabrication and assembly. At either end are two smaller members which provide support for the shafts and rotary seals. The main section of housing 1 is modified by inlets 2a and 2b and outlets 3a and 3b. Inlets 2a and 2b serve to convey high pressure hydraulic fluid from independently controlled sources to gear motors 37 and 38. The fluid is furnished from a pressurized hydraulic system located remotely and not shown except schematically in FIGURE 1. Outlets 3a and 3b convey the spent or exhaust fluid to the pumping system reservoir for subsequent re-use.

Although not shown in detail, inlets 2a, 2b and outlets 3a, 3b are connected by conventional piping to the pumping system indicated schematically in FIGURE 1. This system may be composed of commercially obtainable hydraulic pumping apparatus comprising standard flow control valves for independent adjustment of pressure and volume to inlets 2a, 2b and various pressure regulation devices.

All are connected in a manner well known by those skilled in the art and for that reason are not shown nor described further.

Inlet 2a and outlet 3a communicate internally with channels 4a and 5a. These channels are annular cavities machined into the wall of a central bore 6a of the housing 1 which encircles a portion of spindle 7a.

Spindles 7a and 7b constitute the end extensions of a rotary carrier 8 by which the carrier 8 is rotatably journaled. Spindle 7a extends into bore 6a and is journaled in the inner rotating ring of antifriction bearing 9. The outer stationary ring of this bearing 9 is suitably constrained in the bore 6a. Likewise, spindle 7b is journaled in the inner ring of antifriction bearing 10 and the outer stationary ring of bearing 10 is retained in a matching recess of housing 1.

Spindle 7a is modified internally by dual passageways 11a and 12a which extend generally longitudinally along the rotational axis. Passageway 11a communicates at one end with channel 4a and at the other end with chamber 13a which serves as the high pressure input of gear motor 11. Passageway 12a communicates at one end with chamber 14a which is the low pressure exhaust chamber of gear motor 11 and terminates at the other end opposite channel 5a. Thus, spindles 7a and 7b serve not only to rotatably support carrier 8 but also as means for conveying hydraulic fluid from the stationary sources to the rotary power stages.

Gear motor 37 is an expansible chamber type hydrostatic gear motor comprising a sun gear 15a and a pair of coacting planetary gears 16a and 17a. The gears are retained in circular recess of an intermediate plate 18a which is flat and essentially the same thickness as the gears. Sun gear 15a is coupled through a spline type connection to one end of the driver shaft 19. Near the same end shaft 19 is journaled in an ordinary antifriction bearing 20 which is retained in a central bore of a spacer plate 21. Driver shaft 19 is coincident with the rotational axis of carrier 8 and extends longitudinally through a central passage of spindle 7a. Near the external end, it is journaled in another antifriction bearing 22 whose outer ring resides in a matching recess of housing 1. A commercial rotary shaft seal 23a encircles the shaft 19 and protects bearing 22 from the outside environment.

Planetary gears 16a and 17a are rotatably journaled on hydrostatic bearings about stationary hollow shafts or arbors 24 and 25. Hollow passageways 26 and 27 extend the length of the arbors and serve to convey high pressure lubricant through apertures opposite the planetary gears. The lubricant occupies the narrow annular space between a gear and the arbor and thereat forms a hydrostatic bearing on which the gears rotatably float. At the spindle 7b end, the lubricant passageways 26 and 27 connect into a pair of conduits 28 which are separate from the hydraulic fluid conveying passageways 11b and 12b. These conduits 28 join into annular chamber 29 and by that with an input 30. Although not shown, input 30 is connected by suitable piping to a high pressure lubricant pump which forces the lubricant through the aforementioned system to each planetary gear.

Sun gear 15b is similarly connected to a second shaft hereinafter described as driven shaft 31. This shaft 31 is journaled in the central bore of spacer plate 21 in antifriction bearing 32 and extends longitudinally through the central passage of spindle 7b. It is journaled in an antifriction bearing 33 which unlike bearing 22 is retained by a threaded collar 34 in a matching recess of spindle 7b. The external end of shaft 31 may be modified to fit any type connection depending on the intended use. A rotary seal 23b provides the same function as its aforementioned counterpart.

It is noted that carrier 8 is composed of intermediate plates 18a, b and spacer plate 21 whose surfaces are ground and lapped optically flat and held in alignment by two steel pins 35 (only one is shown in FIGURE 1). These are clamped between spindles 7a, 7b and held together tightly by tie bolts 36 which threadedly engage spindle 7b.

From the foregoing it is seen that shafts 19 and 31 are coincident with the rotational axis of carrier 8, axially in line and are free to rotate independently of each other.

In operation, high pressure hydraulic fluid is fed at controlled rates from the pumping system (not shown) through inlet 2a into chamber 13a. Fluid reacting against the planetary gears 16a and 17a causes them to rotate about their arbors 24 and 25 in the (clockwise) direction shown by the arrows. If it is assumed for the moment that the stage III power input is zero; that is, shaft 19 and sun gear 15a remain fixed, gears 16a, 17a will orbit about sun gear 15a in the clockwise direction and thereby rotate carrier 8 as shown by the arrow.

At this point, with hydraulic fluid not jet introduced into inlet 2b, the power input of stage II is zero. It is noted that because carrier 8 is rotating, planetary gears 16b and 17b are freely rotating as satellites about sun gear 15b and therefore no power is transmitted to the output shaft 31. If however planetary gears 16b, 17b and sun gear 15b are locked or constrained from rotation in some manner, the output of stage I will be transmitted through carrier 8 to sun gear 15b and shaft 31 will be driven at the speed of carrier 8. In the present case this is achieved by introducing pressurized hydraulic fluid through inlet 2b into chamber 13b. A fluid blocking action occurs which prevents gears 16b and 17b from orbiting about gear 15b. As the pressure and flow rate of the hydraulic fluid into inlet 2b is increased, stage II becomes operative and creates a reaction torque condition which overdrives stage I. This condition occurs when planetary gears 16b, 17b commence rotation about arbors 24, 25 in the opposite direction (as shown by the arrows in the figure) of gears 16a, 17a. The relative speed between gears 16b, 17b and sun gear 15b which previously was zero is added to output speed of shaft 31. Thus the measured speed of shaft 31 is the sum of the speed of carrier 8 which is the orbiting speed of planetary gears 16a, 17a and the speed of gears 16b, 17b rotating about their own axes. Furthermore by connecting shaft 19 to a third power source, a third stage speed increase of one-to-one ratio to the output is obtained. In other words, if the inlets and the outlets to gear motors 11 and 12 are closed, stages II and III function as a locked hydrostatic coupling and the speed of shaft 19 is transmitted directly to the output shaft 31. Consequently, it becomes apparent that the third stage provides not only an added speed increase but can serve as a simple trimmer means for accurate speed control as indicated by the schematic showing of FIGURE 1.

FIGURES 2a, 2b, 3, 4, 5, and 6 illustrate a practical preferred embodiment of the drive which is capable of producing 100 horsepower output at speeds upwards of 20,000 r.p.m.

Housing 1 is made of high strength steel alloy and is an assembly of four parts. Accordingly, the main section is made of two identical halves 40 bolted together at their flange by a plurality of threaded fasteners. An elastomeric gasket 41 at the flange interface insures a fluid tight seal. End bell 42 and cover 43 are attached by threaded fasteners to the halves 40 and make up the remaining sections of housing 1. Gaskets 44 and 45 provide a fluid tight seal.

Carrier 8 is rotatably mounted within the main section of housing 1 on spindles 7a and 7b. Spindle 7a is journaled in a pair of commercial type angular contact antifriction bearings 9. These bearings 9 are retained in a spacer ring 46 which is held to the end bell 42 by threaded fasteners. Spindle 7b is journaled on a single commercial type bearing 10. Both bearings are fixed to the spindles by means of threaded lock nuts 47 and 48. Interposed between inlets 2a, 2b, outlets 3a, 3b and the spindles 7a, 7b are fluid distributor sleeves 49a and 49b. The sleeves are pinned to the housing 1 against rotation by two hardened steel dowel pins 50 (only one is shown). The external diameter of sleeve 49a is adapted with grooves which carry O-ring gaskets 51a, 52a, and 53a. These separate and provide a fluid tight seal between the high pressure channel 4a and exhaust channel 5a. The inside diameter of sleeve 49a contains a thin coating of a soft leadbase babbit metal. The coating forms a metal-to-metal seal between the rotary spindles and the stationary sleeve after the first few revolutions at startup and thereby prevents leakage from the high pressure channel 4a into low pressure channel 5a.

Figure 4:
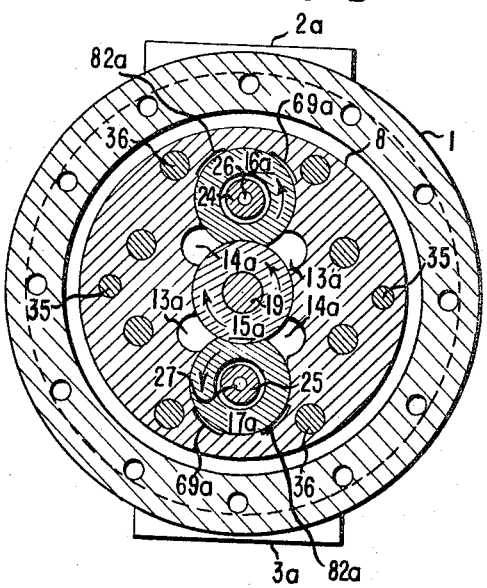
FIGURE 4 is a transverse cross sectional view taken along line 4—4 of FIGURE 2a showing the planetary gear motor of the first stage.
Figure 5:
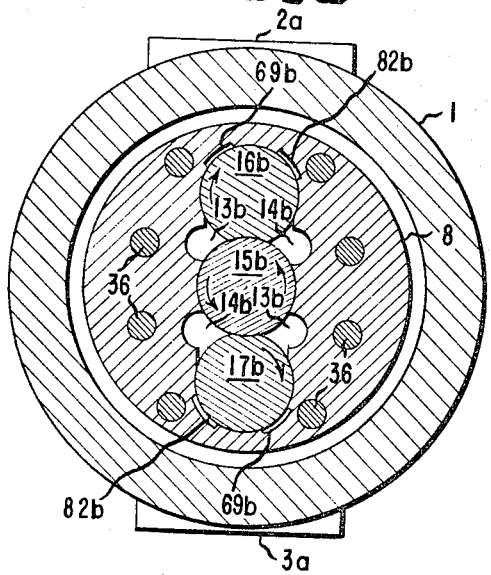
FIGURE 5 is a transverse cross section view taken along line 5—5 of FIGURE 2b showing the planetary gear motor of the second stage.

In FIGURES 2a and 2b, only one half of both planetary gear arrangements is shown for purposes of simplifying the drawings; however, it is conceivable to use one planetary gear per motor. In actual use, two planetary gears form a dynamically balanced motor. Accordingly, as best shown in FIGURES 3 and 4, spindle 7a is adapted with dual passageways 11a and 12a to supply fluid power to dual chambers 13a and 14a. Thus, planetary gears 16a and 17a operatively coact to drive stage I.

Driver shaft 19 is rotatably journaled at the outboard end in a pair of commercial angular contact type anti-friction bearings 22 which are retained in a matching recess of end bell 42 and are fixed against a shoulder on the shaft by a threaded lock nut 54. The opposite end is journaled in a sleeve type bearing 55 which is pressed into the central bore of spacer plate 21. Opposite bearing 55 the central bore is modified by an annular recess 56 which communicates through a feeder conduit 57 with a second annular space 58 surrounding arbor 24. Space 58 connects with passageway 26 through a pair of radial holes in arbor 24. Bearing 55 contains a plurality of radial apertures 59 which connect the recess 56 with a longitudinal passage 60 in shaft 19. Passage 60 terminates near the outboard end of shaft 19 into an annular groove 61 which is fabricated into a bushing 62 that encircles the shaft 19. Bushing 62 in turn is seated in the end bell 42 opposite a threaded feed port 63. Gaskets 64 and 65 form a fluid tight seal around groove 61 and the port 63.

Figure 6:
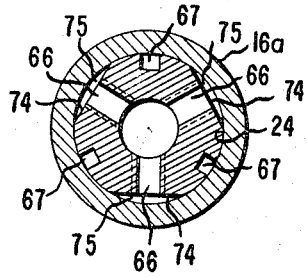
FIGURE 6 is an enlarged transverse cross sectional view taken along line 6—6 of FIGURE 2a showing the planetary gear hydrostatic bearing arrangement.

As shown in FIGURE 6, arbor 24 is modified by three equally spaced flats 74 which are located directly under the planetary gears. The modified portions of arbor 24 define shallow clearances 75 into which pressurized lubricant enters and forms a hydrostatic bearing. Each clearance 75 communicates with passageway 26 through radial apertures 66. Open face longitudinal grooves 67 between the flats 74 serve to reduce the effective surface area in contact with the inside bores of the gears.

As shown in FIGURES 2a and 4, leakage of lubricant from the hydrostatic bearings is carried through conduits 68a which connect with recesses 69a.

Shaft 31 is journaled in two commercial type antifriction bearings 32 that are retained in the central bore of spacer plate 21 and affixed to the shaft by a locknut 70. The outboard end of shaft 31 is journaled in two commercial, angular contact type antifriction bearings 33. These bearings 33 are held to the shaft 31 by means of a locknut 71 and are retained against a shoulder in a matching recess of spindle 7b by a lock spring 72. A slinger 73 which is press fit on the shaft 31 immediately inside of cap 43 prevents contaminates from entering and internal leakage from escaping outside along the shaft 31.

It is noted that inasmuch as shaft 31 rotates at the high output speeds, bearing 33 is journaled in carrier 8 to reduce the deleterious effects of high surface velocities. All the aforementioned bearings are thereby subjected to relatively low speeds. In other words, the high absolute speed of shaft 31 is shared by bearings 33 and 10.

In operation, the drive is connected to a suitable hydraulic pumping system (not shown) which may comprise two high pressure, high capacity hydraulic pump units driven by separate electric motors. The output of one pump unit is connected to inlet 2a of stage I and the output of the other is connected to inlet 2b of stage II. The system is provided with a sufficient reservoir which is connected to outlets 3a, 3b. Any light grade, flameproof, mineral-base hydraulic fluid preferably containing an anti-foaming and rust preventative additives can be used. It is important however that the fluid be thoroughly filtered and cleaned before entering the drive due to the close clearances in the gear motors.

As previously mentioned, stage III at startup may be held fixed. The fluid is fed into inlet 2a and circulates around the annular chamber 4a into dual passageways 11a and into the input chambers 13a. As the pumping system is equipped with variable flow control valves and pressure regulators, initial flow is directed to inlet 2a only. A third pump driven by its own electric motor is connected to the inlet port 63 and supplies lubricant at 5,000 p.s.i. to the planetary gear bearings of both stages.

At rated power, hydraulic fluid is supplied to inlets 2a and 2b at 3,000 p.s.i. and 90 gallons per minute. The speed of stage I (carrier 8) is 10,000 r.p.m. and stage II (planetary gears 16b, 17b) is 10,000 r.p.m. Accordingly, shaft 31 speed is about 20,000 r.p.m. with a torque output of 310 in.-lbs. The measured mechanical efficiency of the drive under these conditions is 83 percent and the volumetric efficiency is 75 percent. Fluid temperature remains constant at about 110° F.

The drive may be operated at any speed by merely adjusting stage I or stage II power input and is limited only by the desired end use conditions.

It is believed to be clear that an improved apparatus has been provided in accordance with the objects of the invention.

Although a preferred embodiment of the invention has been described in detail in accordance with the patent law, many variations and modifications within the spirit of the invention will occur to those skilled in the art, and all such are intended to fall within the scope of the following claims.

What is claimed is:

1. An improved high speed power transmission apparatus comprising in combination, an outer housing structure having a hollow interior portion, a first shaft member rotatably mounted in said housing structure and provided with a rigidly mounted sun gear element positioned in said hollow interior portion of the outer housing, a second shaft member rotatably mounted in said housing structure in alignment with said first shaft member and provided with a rigidly mounted sun gear element positioned in said hollow interior portion and spaced a given distance from said sun gear element on said first shaft, said combination further comprising an inner housing rotatably mounted in the hollow interior portion of said outer housing for concentric rotation with respect to said shaft members, a first planetary gear element rotatably mounted in said inner housing for rotation about an axis parallel and spaced from the axes of said shaft members, said first planetary gear element positioned and aligned in operative meshing engagement with said sun gear element on said first shaft member, a second planetary gear element rotatably mounted in said inner housing for rotation about an axis parallel and spaced from the axes of said shaft members, said second planetary gear element positioned and aligned in operative meshing engagement with said sun gear element on said second shaft member, said planetary gear elements mounted for independent rotation relative to each other, said outer housing, said inner housing, and said shaft members provided with structure defining passageways for conducting pressurized fluid to and from a fluid supply means outside said outer housing into operative driving relationship with said planetary gear elements and their engaged sun gear elements to drive said planetary gear element-sun gear element combinations as fluid motors with the planetary gear elements rotating in opposite directions relative to each other and the inner housing.

2. The improved apparatus of claim 1 in which further comprises an independent supply means for pressurized fluid for each planetary gear element-sun gear element combination, and said passageways conduct fluid from one of said supply means to one of said planetary gear element-sun gear element combinations.

3. The improved apparatus of claim 2 which further comprises a driving means operatively connected to said first shaft member for rotating the same simultaneously with supply of pressurized fluid to said passageways.

4. The improved apparatus of claim 3 in which said planetary gear elements are each provided with a rotatable shaft element with hydrostatic bearing means for supplying pressurized fluid at a plurality of at least three equidistant peripherally spaced points around said shaft elements.

References Cited

UNITED STATES PATENTS

| 1,738,645 | 12/1929 | Gilman | 91—56 |
| 1,882,222 | 10/1932 | Lewis | 74—794 |
| 2,240,874 | 5/1941 | Thomas et al. | 91—56 |

FOREIGN PATENTS

| 637,778 | 5/1950 | Great Britain. |

ROBERT M. WALKER, *Primary Examiner.*

T. C. PERRY, *Assistant Examiner.*